(12) United States Patent
Fanshier et al.

(10) Patent No.: US 12,274,188 B2
(45) Date of Patent: Apr. 15, 2025

(54) IN-LINE TANDEM AXLE ASSEMBLY

(71) Applicant: AGCO Corporation, Duluth, GA (US)

(72) Inventors: Benjamin Anson Fanshier, Hesston, KS (US); Ross Duerksen, Hesston, KS (US); Douglas J. Grollmes, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 4 days.

(21) Appl. No.: 18/175,602

(22) Filed: Feb. 28, 2023

(65) Prior Publication Data
US 2023/0200277 A1 Jun. 29, 2023

Related U.S. Application Data

(63) Continuation of application No. 16/470,299, filed as application No. PCT/IB2017/001293 on Oct. 25, 2017, now Pat. No. 11,596,092.

(60) Provisional application No. 62/434,651, filed on Dec. 15, 2016.

(51) Int. Cl.
| | |
|---|---|
| *A01B 63/16* | (2006.01) |
| *A01B 63/24* | (2006.01) |
| *A01B 73/06* | (2006.01) |
| *A01C 7/20* | (2006.01) |
| *A01C 15/00* | (2006.01) |
| *F16C 11/04* | (2006.01) |

(52) U.S. Cl.
CPC .............. *A01B 63/16* (2013.01); *A01B 63/24* (2013.01); *A01B 73/065* (2013.01); *A01C 7/208* (2013.01); *A01C 15/005* (2013.01); *F16C 11/045* (2013.01)

(58) Field of Classification Search
CPC ....... A01B 63/16; A01B 63/24; A01B 73/065; A01C 7/208; A01C 15/005; F16C 11/045
See application file for complete search history.

(56) References Cited

U.S. PATENT DOCUMENTS

| | | | | |
|---|---|---|---|---|
| 2,208,599 | A * | 7/1940 | Ronning | B62D 7/04 |
| | | | | 301/36.3 |
| 2,222,857 | A * | 11/1940 | Ronning | B62D 49/00 |
| | | | | 301/5.1 |
| 4,131,170 | A * | 12/1978 | van der Lely | B60K 5/08 |
| | | | | 180/24.06 |
| 5,139,314 | A * | 8/1992 | Deckler | B60B 11/08 |
| | | | | 301/36.3 |
| 8,186,449 | B2 * | 5/2012 | Hackert | A01B 63/16 |
| | | | | 172/311 |
| 9,556,902 | B2 * | 1/2017 | Blunier | F16C 11/045 |
| 2016/0135354 | A1 * | 5/2016 | Thorsell | A01B 63/16 |
| | | | | 56/320.1 |

* cited by examiner

*Primary Examiner* — Christopher J Sebesta
*Assistant Examiner* — Joel F. Mitchell

(57) ABSTRACT

In one embodiment, an in-line tandem axle assembly comprising: a tandem wheel arm; a pair of wheel connecting assemblies, each comprising a hub and a spindle; a pair of mounts coupled respectively to the pair of wheel connecting assemblies; a pair of wheels coupled respectively to the pair of wheel connecting assemblies, the pair of wheels separated by the tandem wheel arm and in a same fore-and-aft position; and plural pairs of parallel links of equal length pivotably mounted to the pair of mounts and pivotably mounted to the tandem wheel arm.

18 Claims, 7 Drawing Sheets

IN-LINE TANDEM AXLE ASSEMBLY

CROSS-REFERENCE TO RELATED APPLICATIONS

This application is a continuation of U.S. patent application Ser. No. 16/470,299, "In-Line Tandem Axle Assembly," filed Jun. 17, 2019, as a national phase entry under 35 U.S.C. § 371 of International Patent Application PCT/IB2017/001293, filed Oct. 25, 2017, designating the United States of America and published in English as International Patent Publication WO 2018/109543 A1 on Jun. 21, 2018, which claims the benefit of the filing date of U.S. Provisional Patent Application 62/434,651, filed Dec. 15, 2016, the entire disclosure of each of which is incorporated herein by reference.

TECHNICAL FIELD

The present disclosure is generally related to towed implements, and, more particularly, tandem axles for towed agricultural implements.

BACKGROUND

Towed implements, such as those with soil working implements (e.g., row units) attached, often use walking tandems. Walking tandems use wheels (including the tire mounted thereon) in a configuration in which one wheel of the tandem leads the other by a defined distance. However, since one wheel leads the other, a sharp turn may cause the lagging wheel to drag or push, creating a small mound of dirt that may compromise yield, particularly in no till conditions. Further, when space is a limitation to the rear, a center point (center of gravity) of the walking beam is shifted, which places more mass behind the tandem pivot, causing less weight to be carried on the hitch. This condition may lead to situations of negative tongue weight, which may cause a corresponding hitch to rise at the tail end of the towing vehicle. Traditional duals may be used, but one shortcoming to using them is that the load is not equalized over both wheels and spindles under certain conditions (e.g., when one of the wheels encounters an obstacle or trench or furrow), which may result in undesirable high compaction areas (e.g., for planting applications).

BRIEF SUMMARY

In one embodiment, an in-line tandem axle assembly comprising: a tandem wheel arm; a pair of wheel connecting assemblies, each comprising a hub and a spindle; a pair of mounts coupled respectively to the pair of wheel connecting assemblies; a pair of wheels coupled respectively to the pair of wheel connecting assemblies, the pair of wheels separated by the tandem wheel arm and in a same fore-and-aft position; and plural pairs of parallel links of equal length pivotably mounted to the pair of mounts and pivotably mounted to the tandem wheel arm.

BRIEF DESCRIPTION OF THE DRAWINGS

Many aspects of an in-line tandem axle assembly of the present disclosure can be better understood with reference to the following drawings. The components in the drawings are not necessarily to scale, emphasis instead being placed upon clearly illustrating the principles of an in-line tandem axle assembly. Moreover, in the drawings, like reference numerals designate corresponding parts throughout the several views.

DETAILED DESCRIPTION

Figure 1:
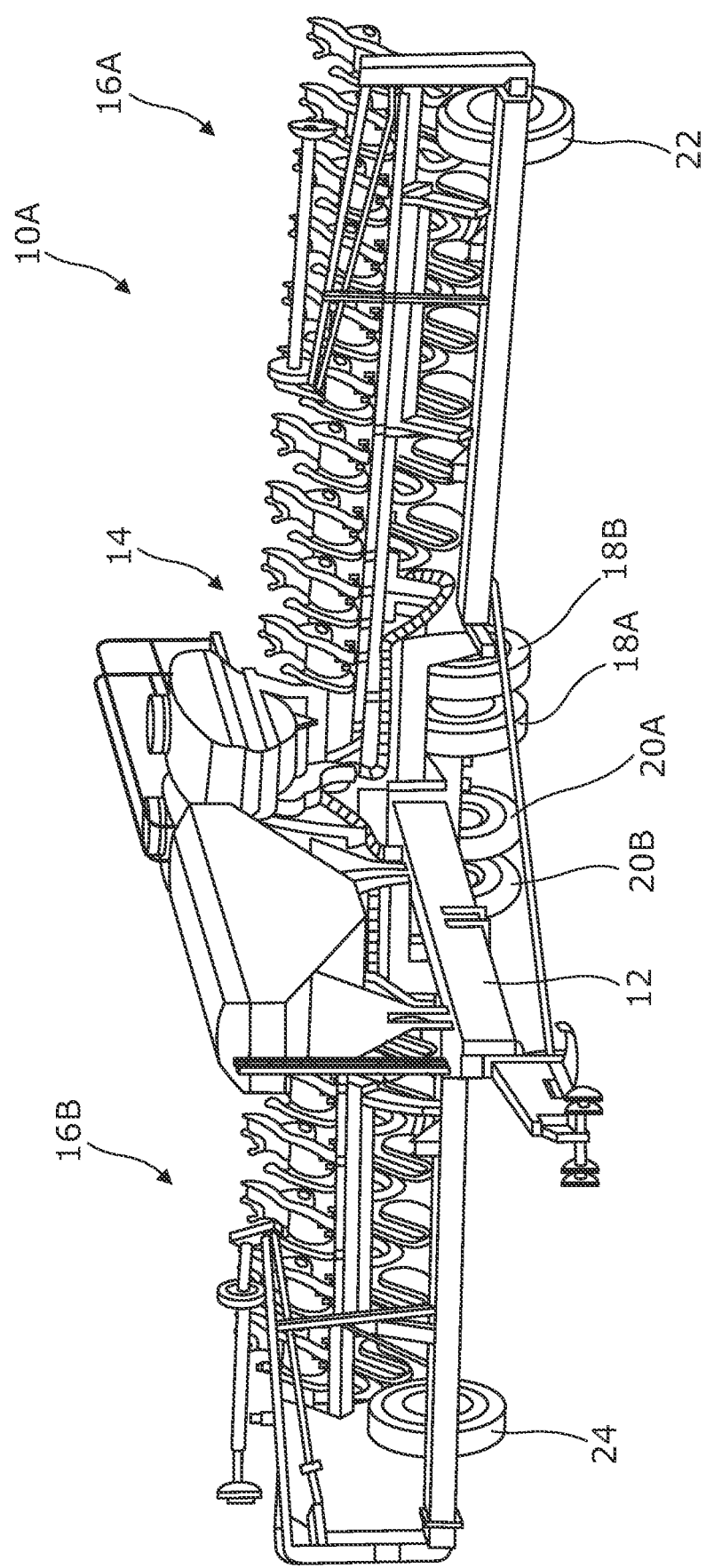
FIG. 1 is a schematic diagram that illustrates, in front perspective view, an example implement in which an embodiment of an example in-line tandem axle assembly may be used.

Certain embodiments of an in-line tandem axle assembly, system, and method are disclosed that replace a walking beam tandem, such as used on conventional implements, with a set or sets of parallel links to enable the wheels (hereinafter, reference to wheel or wheels includes the tire(s) mounted thereon except where distinguished below) to be in a same fore-and-aft position while flexing independently to enable an equalization of ground pressure (e.g., loads) between the two wheels. Such a configuration of the disclosed embodiments also provides the space efficiency of dual wheels when compared to tandem walking beams while employing a similar load distribution effect.

Digressing briefly, conventional implements often use walking beam tandem configurations to distribute the weight load. However, walking beam tandems, with their different fore-and-aft wheel placement, consume more space than in-line duals, and also tend to place more weight on the implement, sometimes resulting in what is often referred to as a negative tongue weight that can lift the back end of a towing vehicle under certain conditions. Also, the walking beam tandem configuration tends to create what is referred to as a scrubbing effect, where for tight turns, one of the tandem wheels drags, creating a mound of dirt that can compromise seeding depth and hence yield. In contrast, certain embodiments of an in-line tandem axle assembly provide a more space-efficient assembly while eliminating or mitigating the risk of scrubbing and negative tongue weights. For instance, since the in-line configuration enables the wheels to be positioned closer to a row unit than walking beam tandem configurations, more weight can be carried by a towing vehicle hitch to maintain a positive tongue weight.

Having summarized various features of certain embodiments of an in-line tandem axle assembly of the present disclosure, reference will now be made in detail to the detailed description of an in-line tandem axle assembly as illustrated in the drawings. While the disclosure is described in connection with these drawings, there is no intent to limit it to the embodiment or embodiments disclosed herein. Further, although the description identifies or describes specifics of one or more embodiments, such specifics are not necessarily part of every embodiment, nor are all various stated advantages associated with a single embodiment. On the contrary, the intent is to cover all alternatives, modifications and equivalents included within the spirit and scope of an in-line tandem axle assembly as defined by the appended claims. Further, it should be appreciated in the context of the present disclosure that the claims are not necessarily limited to the particular embodiments set out in the description.

Note that references hereinafter made to certain directions, such as, for example, "front", "rear", "left" and "right", or the like, are made as viewed from the rear of an implement (e.g., planter) looking forwardly.

Referring now to FIG. 1, shown is an example implement 10A in which an embodiment of an example in-line tandem axle assembly may be used. Although depicted using an AGCO White planter, it should be appreciated by one having ordinary skill in the art that other types of implements in the same or different industries (and/or by different manufacturers) that use tandem wheels may be used, and hence are contemplated to be within the scope of the disclosure. The implement 10A is typically pulled by a towing vehicle, including a tractor or combine harvester. The implement 10A comprises a hitch or tongue assembly 12, which is coupled to the towing vehicle as is known. The implement 10A comprises a center portion 14 and two wing portions 16A, 16B, which are pivotably coupled to the center portion 14. For instance, the wing portions 16A, 16B may be folded to enable a narrow profile for road transport and/or storage. The center portion 14 comprises an underlying frame that supports product and components enabling the delivery of product to field working components attached thereto. The center portion 14 is supported by plural wheels 18, 20 (e.g., 18A, 18B, 20A, 20B) configured in one embodiment with an in-line tandem axle assembly. The wheels 18A, 18B comprise one set of in-line wheels and the wheels 20A, 20B comprise the opposing set of in-line wheels. The wing portions 16A and 16B comprise respective single wheels 22 and 24 supporting the wing portions 16A, 16B.

Figure 2:
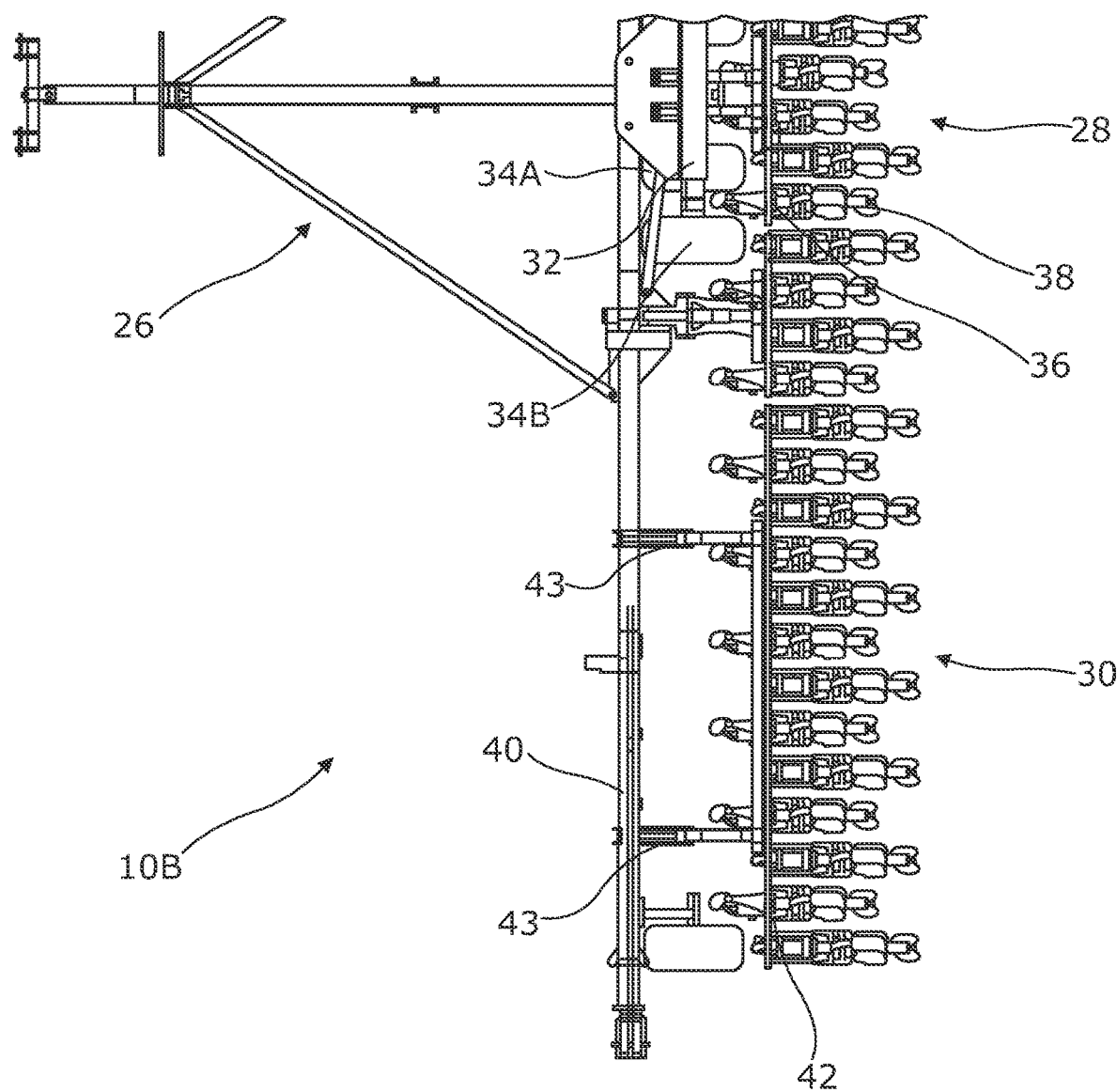
FIG. 2 is a schematic diagram that illustrates, in fragmentary, overhead plan view, an example implement in which an embodiment of an example in-line tandem axle assembly may be used.

FIG. 2 is a schematic diagram that illustrates, in fragmentary, overhead plan view, another example implement 10B, which may be similarly configured to that shown in FIG. 1 or in some embodiments, configured according to a different design. The implement 10B comprises a hitch/tongue assembly 26 that is typically coupled to a towing vehicle for field operations. The implement 10B comprises a center portion 28 (partially shown) and a wing portion 30 (as well as a mirrored wing portion not shown in FIG. 2) that is pivotably coupled to the center portion 28. The center portion 28 comprises a supporting frame that includes a transverse extending (transverse to forward motion of the implement 10B) bar 32 from which a tandem wheel arm (best shown in FIG. 3A) is coupled and extends downward (e.g., orthogonal to the bar 32) to a pair of in-line, tandem wheels 34 (e.g., 34A, 34B) (that is also mirrored on the other side of the center portion 28 but omitted from the depicted view). The center portion 28 further comprises a tool bar 36. The tool bar 36 is parallel to, and rearward of, the bar 32. The pair of in-line tandem wheels 34 (and opposing pair not shown) are forward of the tool bar 36. Coupled to the tool bar 36 are plural row units 38. In one embodiment, the row units 38 are staggered fore and aft, with some of the row units 38 closer to the bar 32 in fore and aft direction and some further from the bar 32. A subset of the row units 38 coupled to the tool bar 36 are partially disposed between the wheels 34A and 34B (e.g., surrounded on two sides by the interior sides of the wheels 34A, 34B), which illustrates the importance of maintaining a wide enough gap between the wheels 34A, 34B and also maintaining the camber (e.g., the distance between the longitudinal center lines of each wheel 34A, 34B) at a constant or substantially constant dimension (e.g., the length between) to avoid interference with the protruding portion of the row unit 38. In one embodiment, the pair of wheels 34 may be angled at zero degrees (e.g., pointing directly forward), and in some embodiments, there may be a slight angle imposed equally to the pair of wheels 34. The wing portion 30 comprises, fore and aft, a draw bar 40 and tool bar 42 that are oriented in parallel with one another, the tool bar 42 pivotably coupled to the draw bar 40 via plural arms 43 that extend from the bars 40, 42 and hingeably couple therebetween.

Figure 3A:
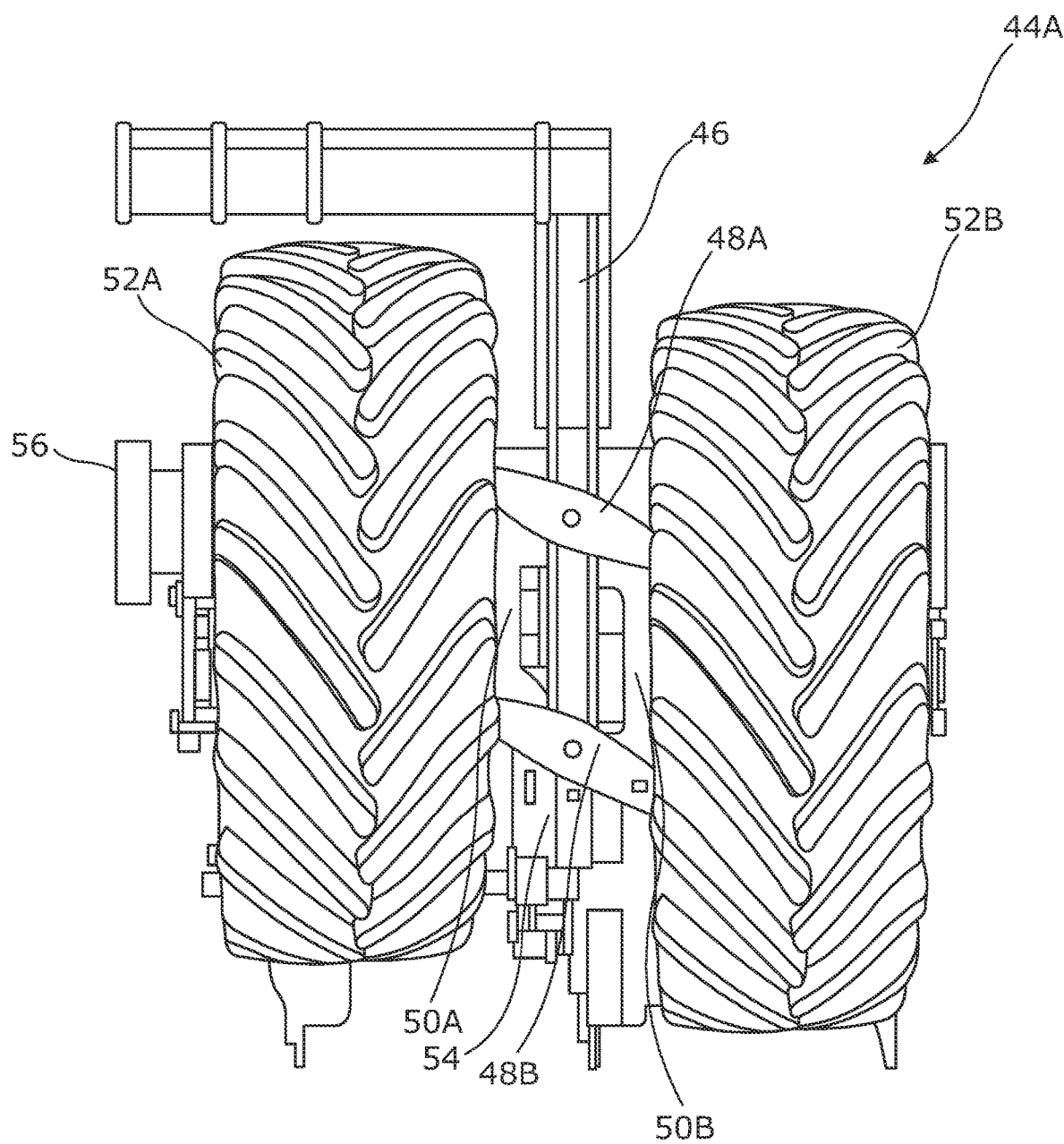
FIG. 3A is a schematic diagram that illustrates, in front elevation view, an embodiment of an example in-line tandem axle assembly.
Figure 3B:
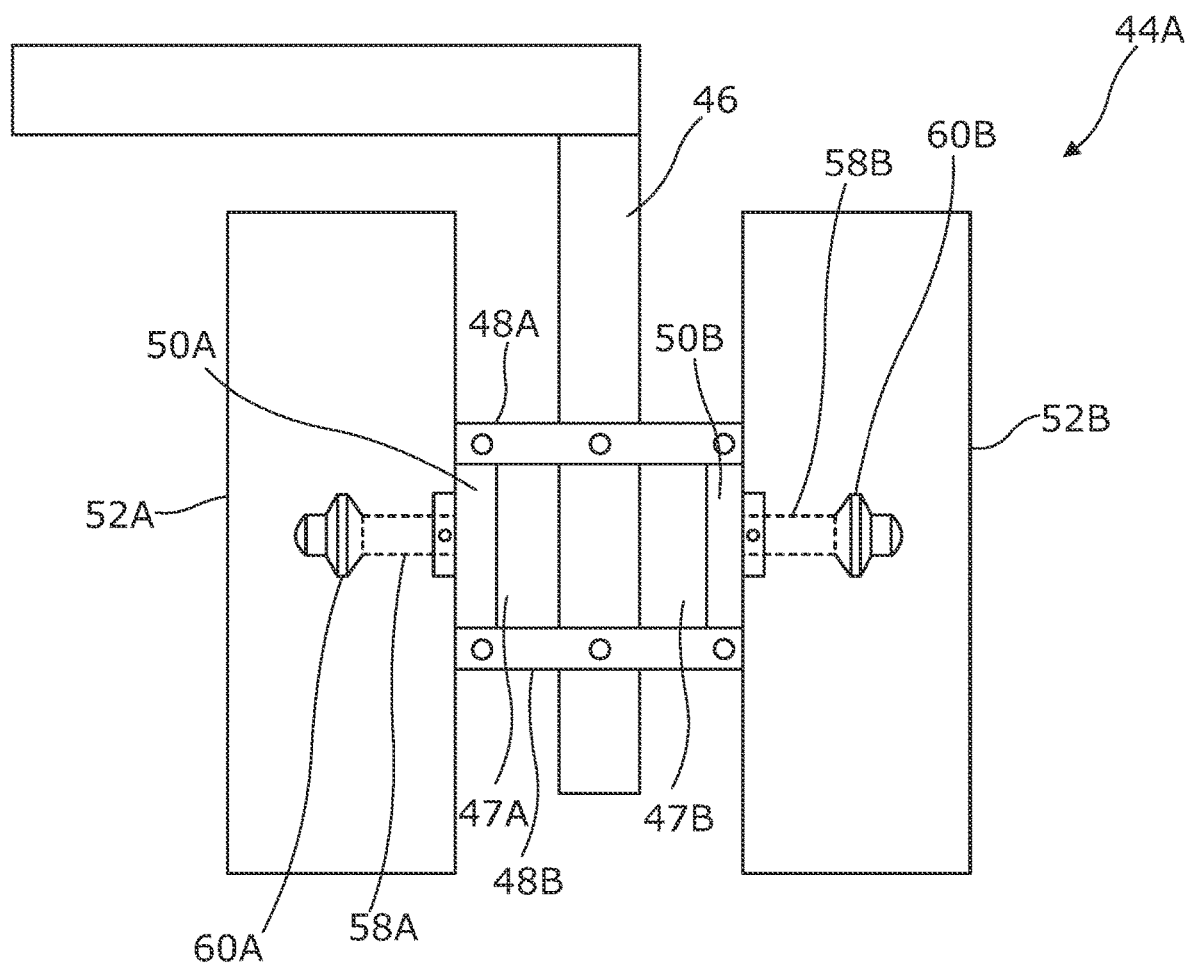
FIG. 3B is a schematic diagram that illustrates, in front elevation view, further detail of an embodiment of an example in-line tandem axle assembly.
Figure 5:
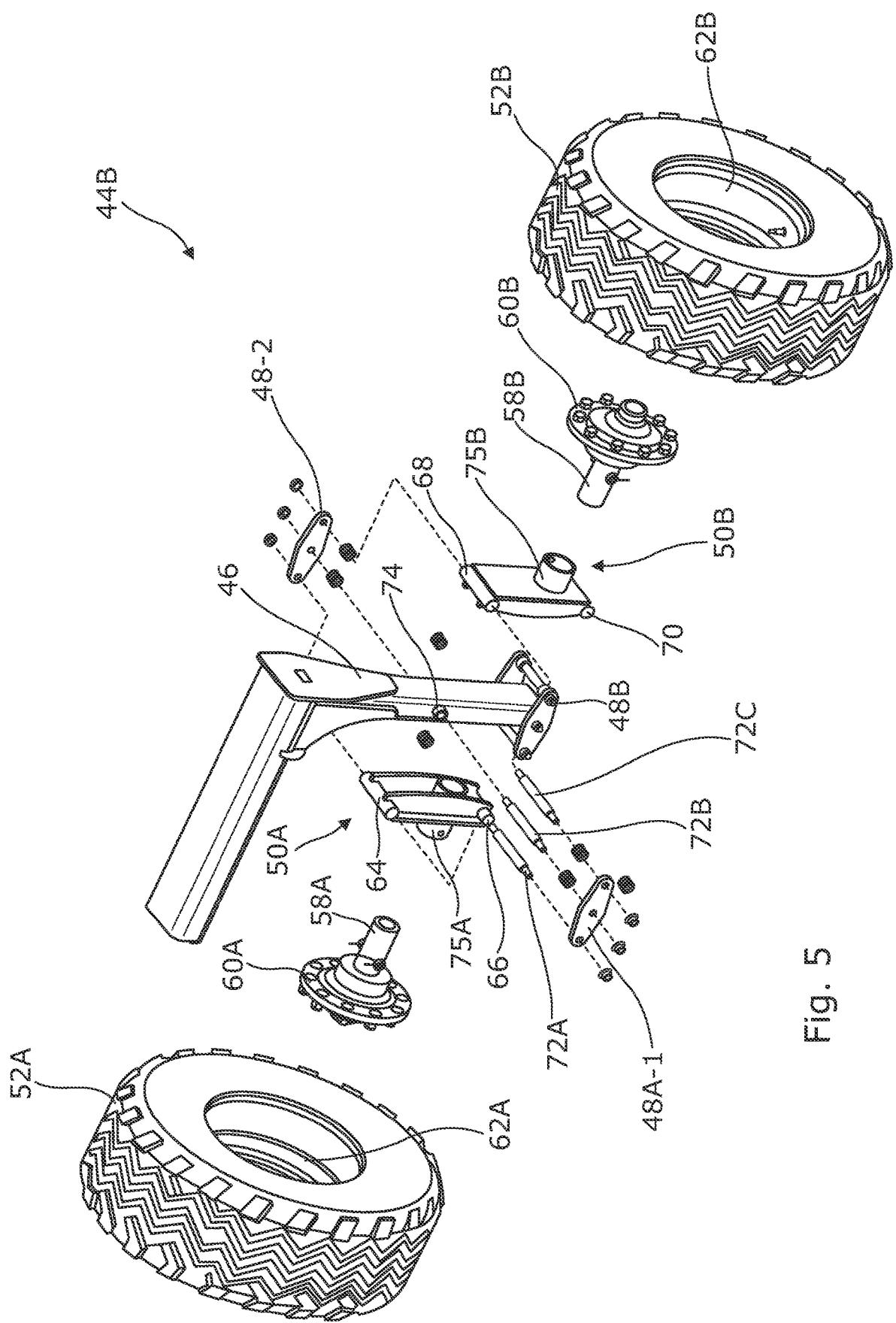
FIG. 5 is a schematic diagram that illustrates, in exploded, perspective view, an embodiment of an example in-line tandem axle assembly.

Having described example implements 10 (e.g., 10A, 10B) in which an embodiment of an in-line tandem axle assembly may be used, attention is directed to FIGS. 3A-3B, which illustrate one embodiment of an example in-line tandem axle assembly 44A. The in-line tandem axle assembly 44A illustrates one of the assemblies for one of the pairs of in-line wheels for a center portion of an implement, where another similarly-structured assembly is duplicated for another pair of wheels. For instance, each in-line tandem axle assembly 44A is used for each pair of wheels 18 (e.g., 18A, 18B), 20 (e.g., 20A, 20B) shown in FIG. 1. Referring in particular to FIG. 3A, an embodiment of the in-line tandem axle assembly 44A comprises a tandem wheel arm (or for brevity, simply referred to as an arm) 46, parallel links 48 (pairs of parallel links comprising upper 48A and lower 48B links, with the understanding that another pair of upper and lower links is opposite the arm 46 as best shown in FIG. 5), a pair of mounts 50 (e.g., 50A, 50B), and a pair of wheels 52 (e.g., 52A, 52B). It should be appreciated that in some embodiments, the in-line tandem axle assembly 44A may include fewer or additional components. The arm 46 is coupled to a transverse extending bar, such as the bar 32 depicted in FIG. 2. In one embodiment, the arm 46 may be welded to the bar 32, or secured by other securement mechanisms (e.g., bolted, formed via a casting or forging process, etc.). The arm 46 extends downward from the bar 32, and extends between the wheels 52 to a location proximal to the lowest flex point for the wheel spindle, as described further below.

The parallel links 48 are pivotably coupled to the arm 46 at relative upper and lower locations for respective central cavities 47A, 47B (shown in FIG. 3B) to enable independent flexing of one wheel 52 (e.g., 52A or 52B) relative to the other wheel 52 (e.g., 52B or 52A). By enabling independent flexing, one or more benefits may be realized, including equal load distribution (which also has the corollary benefit of enabling the tire specification (e.g., maximum inflation pressure specification) to be reduced since the assumption is no longer that all of the load will be borne by one wheel, as is typically the case with in-line or dual wheel designs). The parallel links 48 are also pivotably coupled to the mounts 50 for each wheel 52, as described in further detail in FIG. 5. Note that reference to wheels 52 includes the respective tires mounted thereon, as well as the inner rims and associated components where not explicitly referenced. The parallel links 48 (which in one embodiment comprise plural pairs of parallel links, including an upper pair and lower pair on one side of the arm 46 and another upper and lower pair on the opposite side of the arm 46) enable the wheels 52 to flex up and down (e.g., to different elevations), such as when encountering an obstacle or surface unevenness (e.g., including ditch, mound, etc.) in the field. By enabling the flex motion, the in-line tandem axle assembly 44A achieves the wheel motion independence and load distribution benefits of a walking beam tandem, yet in a reduced space and improved (e.g., center of gravity) location. The parallel links 48A, 48B are of equal size (including the upper and lower pair duplicated aft of the depicted links), and in combination with their pivotable coupling to the mounts 50 and arm 46, enable the gap between the inner sides of the wheels 52 to remain substantially constant in dimension (e.g., transverse length), whether at a zero angle (both wheels aligned in a forward direction) or both slightly and equally angled. In other words, the camber between the wheels 52 is substantially constant. The importance of these features can be seen in FIGS. 3A and 4, in which a row unit 57 secured to, for instance, a tool bar 56 (e.g., FIG. 3A, and also shown in FIG. 2) encroaches at least partially within the space between the wheels 52. A variable camber or insufficient length of gap between the wheels 52 may interfere with the row unit 57. A further benefit of the in-line tandem axle assembly 44A over walking beam tandem configurations, as explained above, is that the proximity of the row unit 57 to the wheels 52 enables the center of mass to be proximal to the wheels 52, enabling a positive tongue weight during field operations.

Figure 4:
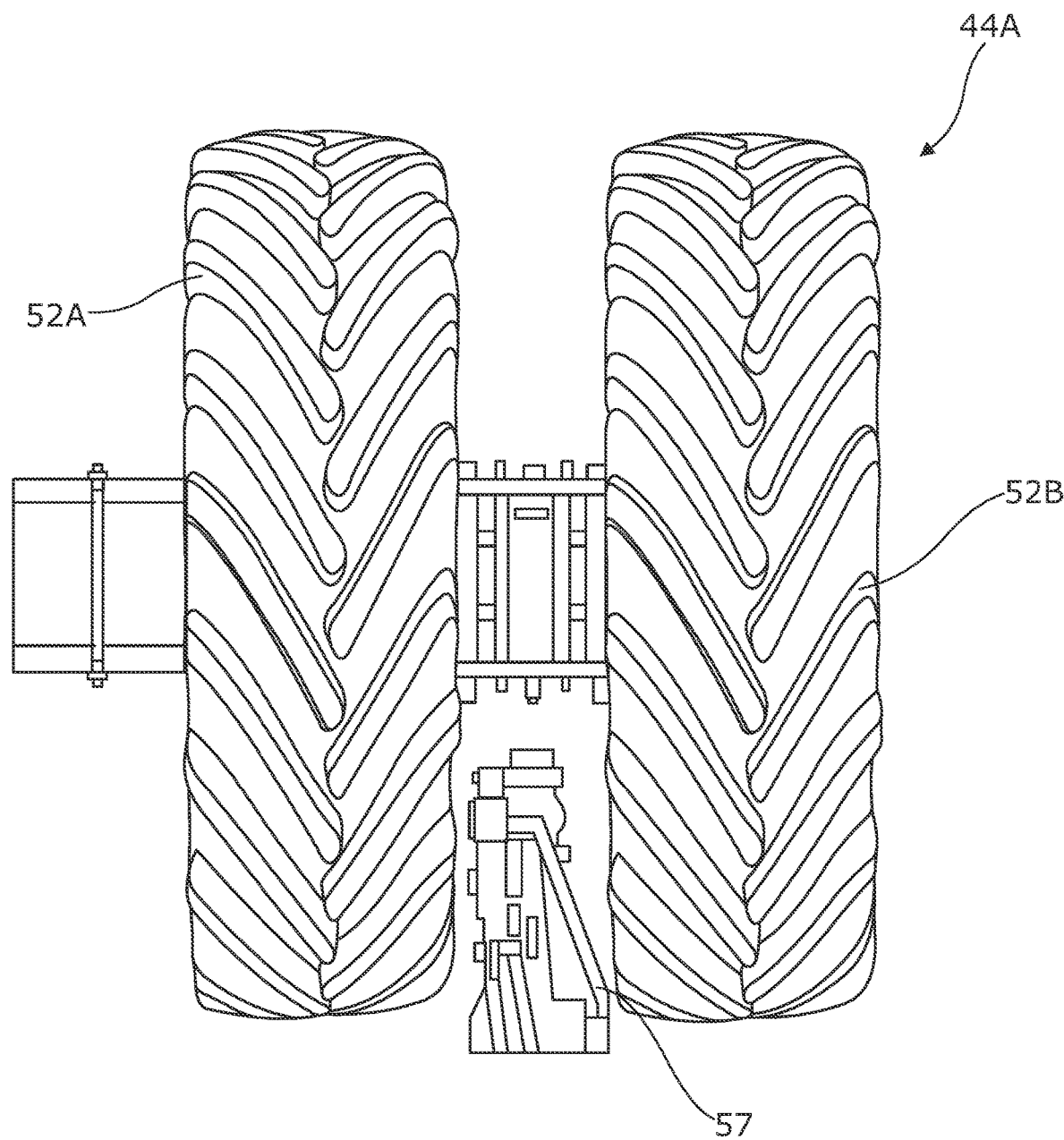
FIG. 4 is a schematic diagram that illustrates, in bottom view, an embodiment of an example in-line tandem axle assembly.

Referring to FIG. 3B, shown is the in-line tandem axle assembly 44A of FIG. 3A and 4 in further detail and for a level surface (no flexing of the wheels 52). Shown are the previously enumerated component parts including the arm 46, central cavities 47, parallel links 48, mounts 50, and wheels 52. The parallel links 48A, 48B are horizontally oriented, owing to the level surface upon which the wheels 52 are placed. The parallel links 48 are pivotably coupled to the arm 46 and the mounts 50. The mounts 50 are each coupled (e.g., bolted, screwed, etc.) to a respective spindle 58 (e.g., 58A, 58B) extending inward from a respective hub, or generally, hub assembly 60 (e.g., 60A, 60B). As is known, each spindle 58 is part of a hub assembly 60 (e.g., 60A, 60B) that is mounted to the wheel 52 (e.g., bolted to the inner rim).

FIG. 5 is a schematic diagram that illustrates, in exploded, (front) perspective view, an embodiment of an example in-line tandem axle assembly 44B, which is similar to the in-line tandem axle assembly 44A depicted in FIG. 3B. From left to right in FIG. 5, the in-line tandem axle assembly 44B comprises the wheel 52A and the hub 60A and spindle 58A, the hub 60A bolted to the inner rim 62A of the wheel 52A. Further shown are the mount 50A, the arm 46 (attached to a transverse bar, which is shown in truncated view in FIG. 5), and the mount 50B, followed by the spindle 58B and hub 60B, and the wheel 52B. Similar to the assembly of the spindle 58A and hub 60A, the hub 60B is mounted to an inner rim 62B of the wheel 52B, and the spindle 58B extends inwardly from the hub 60B as is known. The mount 50A comprises top and bottom cylindrical cavities 64, 66, respectively, which extend fore and aft. The mount 50B likewise comprises top and bottom cylindrical cavities 68, 70, respectively, which also extend fore and aft. Also shown are the parallel links 48 including top links 48A-1 and 48A-2 and pins 72 (e.g., 72A, 72B, 72C) and associated hardware. The pins 72A, 72C are inserted through corresponding, opposing end openings in the links 48A-1 and 48A-2 and the cylindrical cavities 64, 68 and secured with hardware and/or securing mechanisms, enabling a pivotable connection between the links 48 and the mounts 50. Each of the links 48 further comprise a center opening, through which the pin 72B is disposed as well as through a center cavity 74 in the arm 46 and secured thereto via hardware, enabling a pivoting motion of the links 48 relative to the arm 46. The lower parallel links 48B are similarly configured, and shown assembled with the corresponding pins but without coupling to the mounts 50 for illustration. The lower parallel links 48 are pivotably attached to the lower cylindrical cavities 66, 70 of the mounts 50A, 50B in similar manner, and to the lower portion of the arm 46 via a center cavity (not shown). Note that the mounts 50A, 50B are respectively coupled to the spindles 58A, 58B, which are received via cylindrical mounts 75 (e.g., 75A, 75B) extending outward from the mounts 50 and secured thereto by hardware (e.g., a bolt) extending through the cylindrical mounts 75 to the spindles 58. The links 48A-1 and 48A-2 are located on fore and aft sides of the arm 46, as is true for like components for the lower links 48B. Note that the inner rims 62, spindles 58, and hub 60 are collectively referred to herein as wheel connecting assemblies.

Figure 6:
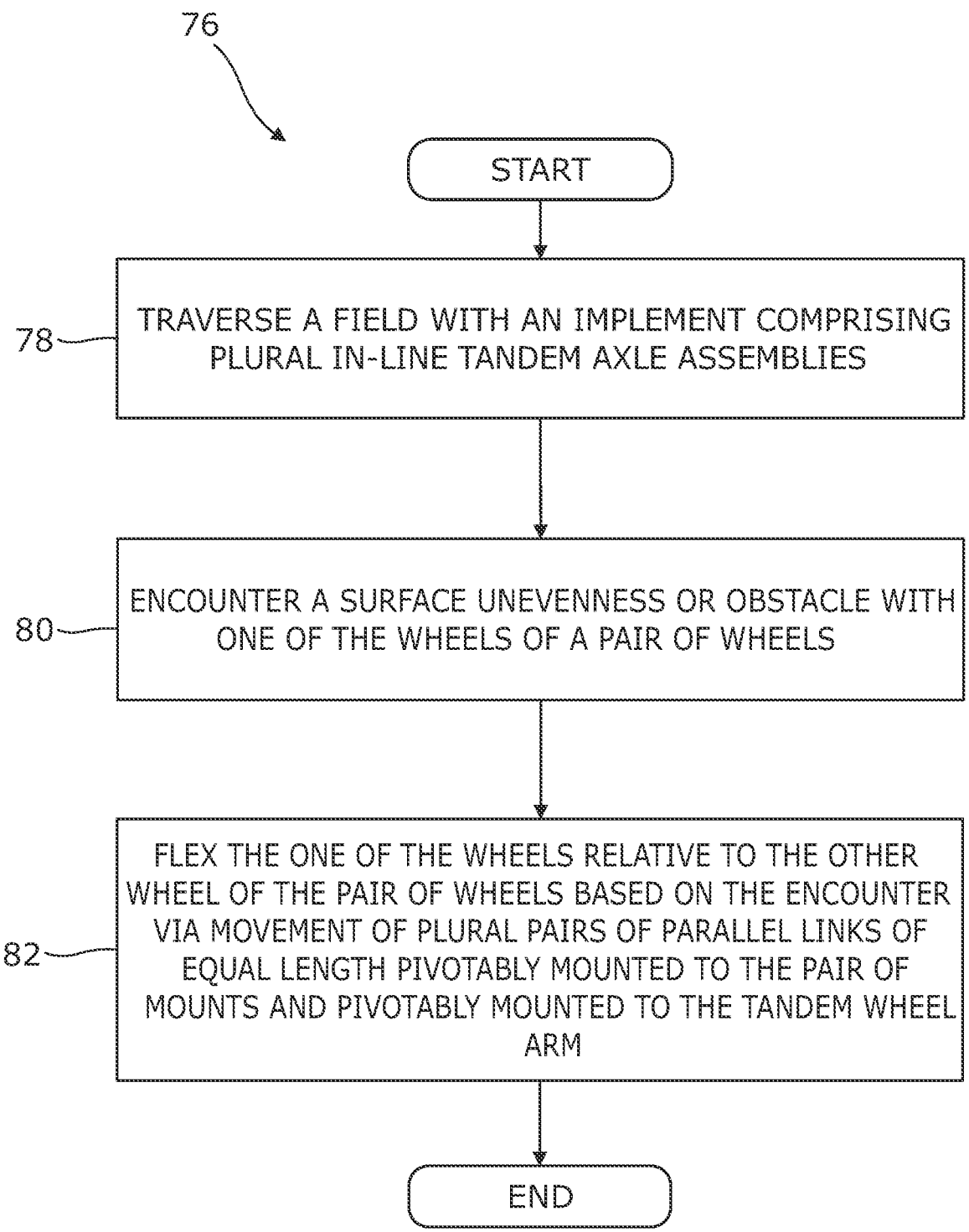
FIG. 6 is a flow diagram that illustrates an embodiment of an example method of adjusting to surface unevenness or field obstacles via operations of an in-line tandem axle assembly.

Having described some example embodiments of an in-line tandem axle assembly, it should be appreciated in view of the present disclosure that one embodiment of a method of adjusting to surface unevenness or field obstacles via operations of an in-line tandem axle assembly, denoted as method 76 in FIG. 6, comprises traversing a field with an implement comprising plural in-line tandem axle assemblies, each of the plural in-line tandem axle assemblies comprising a pair of wheels coupled respectively to a pair of wheel connecting assemblies that are coupled to a pair of mounts, the pair of wheels separated by a tandem wheel arm and in a same fore-and-aft position (78); encountering a surface unevenness or obstacle with one of the wheels of the pair of wheels (80); and flexing the one of the wheels relative to the other wheel of the pair of wheels based on the encounter via movement of plural pairs of parallel links of equal length pivotably mounted to the pair of mounts and pivotably mounted to the tandem wheel arm (82).

Any process descriptions or blocks in flow charts should be understood as representing steps in the process, and alternate implementations are included within the scope of the embodiments in which functions may be executed out of order from that shown or discussed, including substantially concurrently, depending on the functionality involved, as would be understood by those reasonably skilled in the art of the present disclosure.

It should be emphasized that the above-described embodiments of an in-line tandem axle assembly are merely possible examples of implementations, merely set forth for a clear understanding of the principles of the in-line tandem axle assembly. Many variations and modifications may be made to the above-described embodiment(s) of the in-line tandem axle assembly without departing substantially from the spirit and principles of the disclosure. All such modifications and variations are intended to be included herein within the scope of the disclosure and protected by the following claims.

The invention claimed is:

1. An in-line tandem axle assembly for a towed agricultural implement, the assembly comprising:
   a tandem wheel arm;
   plural pairs of parallel links of equal length pivotably mounted to the tandem wheel arm;
   a first wheel mount carrying a first wheel and pivotably connected to one end of each of the plural pairs of parallel links, the first wheel mount on a first side of the tandem wheel arm; and
   a second wheel mount carrying a second wheel and pivotably connected to another end of each of the plural pairs of parallel links, the second wheel mount on a second side of the tandem wheel arm, the second wheel fixed in a same fore-and-aft position as the first wheel relative to a forward direction of travel of the agricultural implement when the agricultural implement is towed through a field;

wherein each pair of parallel links forms a parallelogram defining four included angles, and wherein the included angles change as the wheels move relative to each other; and wherein the parallel links are arranged to maintain a substantially equal camber throughout changes in elevation of the first wheel relative to the second wheel.

2. The in-line tandem axle assembly of claim 1, wherein the tandem wheel arm extends above the wheels in an upright orientation.

3. The in-line tandem axle assembly of claim 1, wherein the wheels are arranged to flex independently.

4. The in-line tandem axle assembly of claim 1, wherein the plural pairs of parallel links are arranged vertically relative to each other along the tandem wheel arm, with one pair arranged fore and one pair aft of the tandem wheel arm.

5. The in-line tandem axle assembly of claim 1, further comprising a plurality of pins, wherein each mount comprises two cylindrical cavities, wherein each pin of the plurality of pins extends through a corresponding cylindrical cavity of the pair of mounts and through a cavity in the tandem wheel arm to couple respective pairs of the plural pairs of parallel links.

6. The in-line tandem axle assembly of claim 1, wherein the parallel links are each mounted directly to the tandem wheel arm.

7. An in-line tandem axle assembly for a towed agricultural implement, the assembly comprising:
a tandem wheel arm;
plural pairs of parallel links of equal length pivotably mounted to the tandem wheel arm;
a first wheel mount carrying a first wheel and pivotably connected to one end of each of the plural pairs of parallel links, the first wheel mount on a first side of the tandem wheel arm; and
a second wheel mount carrying a second wheel and pivotably connected to another end of each of the plural pairs of parallel links, the second wheel mount on a second side of the tandem wheel arm, the second wheel fixed in a same fore-and-aft position as the first wheel relative to a forward direction of travel of the agricultural implement when the agricultural implement is towed through a field;
wherein each pair of parallel links forms a parallelogram defining four included angles, and wherein the included angles change as the wheels move relative to each other;
wherein the parallel links are arranged to remain parallel throughout an entire range of pivotable movement for the parallel links.

8. An agricultural implement, comprising:
a frame;
a tool bar coupled to the frame via at least one pivot arm; and
plural in-line tandem axle assemblies supporting the frame, each in-line tandem axle assembly comprising:
a tandem wheel arm secured to the frame;
plural pairs of parallel links of equal length pivotably mounted to the tandem wheel arm;
a first wheel mount carrying a first wheel and pivotably connected to one end of each of the plural pairs of parallel links, the first wheel mount on a first side of the tandem wheel arm; and
a second wheel mount carrying a second wheel and pivotably connected to another end of each of the plural pairs of parallel links, the second wheel mount on a second side of the tandem wheel arm, the second wheel fixed in a same fore-and-aft position as the first wheel relative to a forward direction of travel of the agricultural implement when the agricultural implement is towed through a field;
wherein each pair of parallel links forms a parallelogram defining four included angles, and wherein the included angles change as the wheels move relative to each other.

9. The agricultural implement of claim 8, wherein the tandem wheel arm of each in-line tandem axle assembly has an upright orientation and extends above each corresponding first and second wheels.

10. The agricultural implement of claim 8, wherein the parallel links of each in-line tandem axle assembly are arranged to maintain a substantially equal camber between each corresponding pair of wheels throughout changes in elevation of the first wheel relative to the second wheel.

11. The agricultural implement of claim 8, wherein the parallel links of each in-line tandem axle assembly are arranged to remain parallel throughout an entire range of pivotable movement for the parallel links.

12. The agricultural implement of claim 8, wherein the wheels of each in-line tandem axle assembly are arranged to flex independently.

13. The agricultural implement of claim 8, wherein the plural pairs of parallel links are arranged vertically relative to each other, with each pair arranged fore and aft of the tandem wheel arm.

14. The agricultural implement of claim 8, further comprising a plurality of pins, wherein each mount comprises two cylindrical cavities, wherein each pin of the plurality of pins extends through a corresponding cylindrical cavity of the pair of mounts and through a cavity in the tandem wheel arm to couple respective pairs of the plural pairs of parallel links.

15. The agricultural implement of claim 8, wherein the plural in-line tandem axle assemblies are disposed between the frame and the tool bar.

16. The agricultural implement of claim 8, further comprising a plurality of row units coupled to the tool bar.

17. The agricultural implement of claim 16, wherein the frame, the tool bar, the plural in-line tandem axle assemblies, and the plurality of row units occupy a center portion of a planter.

18. The agricultural implement of claim 8, further comprising a hitch assembly for coupling the frame to a tow vehicle.

* * * * *